United States Patent [19]
Hunter et al.

[11] Patent Number: 5,998,768
[45] Date of Patent: Dec. 7, 1999

[54] ACTIVE THERMAL CONTROL OF SURFACES BY STEERING HEATING BEAM IN RESPONSE TO SENSED THERMAL RADIATION

[75] Inventors: Ian W. Hunter, Lincoln; Colin J. H. Brenan, Marblehead; Serge R. Lafontaine, Lincoln, all of Mass.

[73] Assignee: Massachusetts Institute of Technology, Cambridge, Mass.

[21] Appl. No.: 09/130,008

[22] Filed: Aug. 6, 1998

Related U.S. Application Data
[60] Provisional application No. 60/055,018, Aug. 7, 1997.

[51] Int. Cl.$^6$ ...................................................... H05B 1/02
[52] U.S. Cl. ............................ 219/502; 118/724; 392/418
[58] Field of Search ........................................ 392/418, 419, 392/416, 421; 118/724, 725, 50.1; 219/85.12, 85.13, 502, 503

[56] References Cited

U.S. PATENT DOCUMENTS

| 3,700,850 | 10/1972 | Lumley et al. | 219/121.69 |
| 4,581,520 | 4/1986 | Vu et al. | 392/420 |
| 4,682,594 | 7/1987 | Mok | 606/7 |
| 5,041,714 | 8/1991 | Funk | 219/121.62 |
| 5,373,135 | 12/1994 | Beyer et al. | 219/121.67 |
| 5,446,825 | 8/1995 | Moslehi et al. | 392/416 |
| 5,508,934 | 4/1996 | Moslehi et al. | 364/468 |

FOREIGN PATENT DOCUMENTS

| 6318558 | 11/1994 | Japan . |
| 7-382131 | 10/1995 | Japan . |

*Primary Examiner*—Mark Paschall
*Assistant Examiner*—Jeffrey Pwu
*Attorney, Agent, or Firm*—Bromberg & Sunstein LLP

[57] ABSTRACT

An apparatus and method for controlling the temperature profile of the surface of a medium such as a solid or a liquid. The surface is imaged onto an array of detectors which generate an electronic output indicative of the temperature profile of the surface. A heating beam provided by a laser is scanned across the surface, providing radiation which heats the surface locally in a pattern based upon the detected temperature profile and the desired temperature profile.

10 Claims, 1 Drawing Sheet

ACTIVE THERMAL CONTROL OF SURFACES BY STEERING HEATING BEAM IN RESPONSE TO SENSED THERMAL RADIATION

The present application claims priority from U.S. provisional application number 60/055,018, filed Aug. 7, 1997, which is herein incorporated by reference.

TECHNICAL FIELD

The present invention pertains to a method for regulating the spatial temperature profile of a surface, and, more particularly, for enhancing the yield of semiconductor devices by precision regulation of the spatial temperature profile of a wafer undergoing processing and for regulating the surface conditions of a liquid microsample subject to microchemical manipulation or analysis.

BACKGROUND OF THE INVENTION

Modern semiconductor processing involves the precision growth of oxide layers across wafers of semiconductor material having diameters as large as 30 cm. During the growth of oxide layers, the entire wafer, or often a large number of wafers, is maintained at a regulated temperature within a furnace. Similarly, the composition of gases within the furnace is controlled. Standard procedure is either to maintain a nearly uniform temperature profile over the region of the furnace containing the wafer or wafers undergoing processing or to provide zonal radiative heating of the wafer. In some cases, the control of temperature may be critical for achieving chemical reaction at the requisite rate.

Other applications require the rapid and precision control of the temperature of a boundary or interface between one medium, which may be a solid or a liquid, and an ambient environment, which may be a second medium such as a liquid or a gas. One such application is microchemistry where precision control of chemical or biological processes is required in some instances.

SUMMARY OF THE INVENTION

In accordance with one aspect of the invention, in a preferred embodiment, there is provided an apparatus for maintaining detailed control of the temperature profile of a boundary between a medium and an ambient environment. The apparatus has a radiation detector for sensing radiation emitted by the boundary for providing an electrical output corresponding to the sensed radiation. The apparatus, furthermore, has a source for emitting a beam of heating radiation, characterized by an intensity, directed to the boundary between the medium and the ambient environment and a scanner for orienting the beam of heating radiation toward a specified position on the boundary. Additionally, the apparatus has a controller for directing the scanner and modulating the intensity of the beam of heating radiation in response to the electrical output of the radiation detector.

In accordance with alternate embodiments of the invention, the radiation detector may be an infrared detector and an array of detector elements. The source of heating radiation may be an optical source and a laser. The radiation sensed by the radiation detector may be produced at the boundary between the medium and the ambient environment in response to irradiation by the heating radiation.

In accordance with further alternate embodiments of the present invention, the apparatus may also have a source of probe radiation for irradiating the boundary between the medium and the ambient environment such as to produce radiation at the surface of the medium for sensing by the radiation detector. The apparatus may further have a wavelength filter disposed between the surface of the medium and the radiation detector.

In accordance with another aspect of the present invention, in one of its embodiments, there is provided a method of maintaining a desired thermal profile across the surface of a medium. The method has the steps of sensing radiation emitted by the solid, creating an electrical output corresponding to the sensed radiation, directing a beam of heating radiation to the surface of the medium, orienting the beam of heating radiation toward a specified position on the surface of the medium and heating the specified position on the surface of the medium in response to at least the electrical output corresponding to the sensed radiation so as to maintain a desired thermal profile across the surface of the medium.

BRIEF DESCRIPTION OF THE DRAWING

The foregoing features of the invention will be more readily understood by reference to the following detailed description taken with the accompanying drawing which provides a schematic representation of a system for the active control of the temperature of a surface undergoing chemical processing in accordance with an embodiment of the present invention.

DETAILED DESCRIPTION OF PREFERRED EMBODIMENTS

Figure 1:
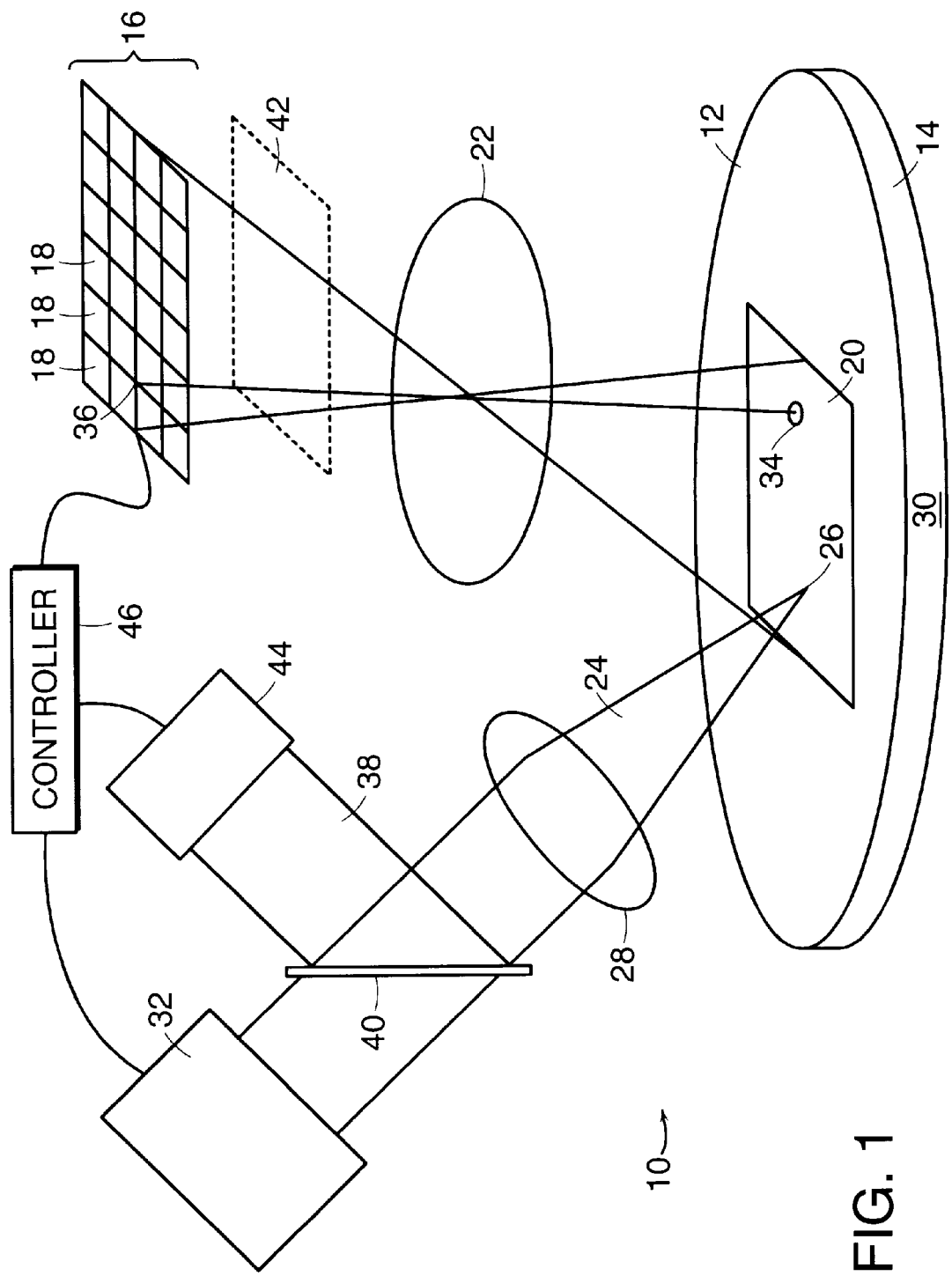

Referring to the Figure, a system, designated generally by numeral 10, is shown schematically whereby the temperature of a surface 12 is monitored and controlled. Surface 12 constitutes a boundary between one medium and another, such as between a solid medium and a gaseous ambient environment, or between one fluid medium and another. An example of a boundary between one fluid and another is a boundary between a droplet of liquid and an ambient environment of saturated air. In particular, surface 12 may be the surface of a semiconductor wafer 14 undergoing chemical processing within a processing furnace. Thermal processing is typically performed in order to grow a layer of oxide as a step in a lithographic process. Thermal processing for the growth of oxide layers on semiconductors is often carried out within the temperature range of 800–1000° C.

Maintaining a uniform or other specified temperature profile across the surface of a medium, while processing of semiconductors or other materials, for example, in oxidizing or reducing atmospheres, is within the scope of the invention as described herein and as claimed in the appended claims. Additionally, the invention may be useful where physical processes are being governed by the temperature of the substrate medium, either instead of, or in addition to, chemical processes. Thus, for example, annealing may be accomplished under a specified thermal regimen, or, in other materials, polymerization may similarly require detailed temperature control.

Surface 12 is monitored, in accordance with the invention, by means of array 16 of optical detectors 18. A surface segment 20 is imaged onto array 16 by means of imaging optical element 22, which may be a lens or a mirror, or various combinations thereof, as known to persons skilled in the art of optical imaging. Alternatively, imaging of surface 12 onto array 16 may not be required if surface 12 is serially polled, as described below.

Surface 12 may be heated locally, by means of a heating beam 24 which may be focussed with high resolution onto a desired position 26 on surface 12 by means of focussing optics 28, which may be a lens or a mirror, or various combinations thereof, as known to persons skilled in the art of optics. Heating beam 24 may be a beam of light at a wavelength tailored to be absorbed at surface 12 of wafer 14 and thereby to provide finely controllable local heating. Alternatively, heating beam 24 may be tailored to penetrate to a desired depth in the volume 30 of wafer 14 in order to induce heating to a desired depth for purposes of annealing of volumetric lattice defects, for example. Additionally, other types of processing may benefit from the activation of color centers, or otherwise, by local application, either at or beneath surface 12, of the beam here designated as heating beam 24. The wavelengths of light included within heating beam 24 are tailored to each application, as known to persons skilled in semiconductor science, and may include ultraviolet, visible, or infrared light. Source 32 of heating beam 24 may be a laser, or other source of light of the desired spectral composition and intensity, and is a matter of design choice of the system designer, according to criteria known to persons skilled in semiconductor science.

Optical detectors 18 may simply monitor the thermal emission of surface 12. Since the emissivity of the surface is substantially uniform, the emission within a specified wavelength range of an element 34 of surface 12 imaged onto a corresponding detector element 36 is a function solely of temperature, readily calculable from Planck's radiation law. At sufficiently short wavelengths (i.e., in the Wien limit), the flux per unit area within a given wavelength range increases exponentially with temperature. The invention is thus sensitive to local temperature variations which may be compensated through directing the heating beam 24 to raster across surface 12 creating a desired temperature profile. Various mechanisms are known to persons skilled in the art for directing the orientation of heating beam 24 with respect to surface 12, including electromechanical or acoustooptical or electrooptical scanning. Any means of pointing heating beam 24 at a desired location on surface 12 is within the scope of the invention and of the appended claims. In a preferred embodiment of the invention, heating beam 24 is constantly scanning across surface 12 in a raster pattern, with the intensity of heating beam 24 modulated according to the output of controller 46 to regulate the temperature at each location on surface 12 and thus to provide the desired thermal profile.

One cause of thermal variations in the surface of semiconductors undergoing processing is the presence of lattice dislocations or other defects, such as of the oxide layer being grown, which cause local discontinuities in thermal characteristics of the medium such as thermal conductivity and heat capacity. These discontinuities may be compensated for using the invention, and, additionally, may be remedied through local application of heating by means of the heating beam. Other irregularities may be more readily identified by means of the surface response to light from a probe beam 38. Probe beam 38 may be used to excite surface 12 thereby giving rise to characteristic optical emission which may be Raman scattering or fluorescent scattering, for example. Probe beam 38 is supplied by probe source 44 and may be combined with heating beam 24, for example, by means of beam combiner 40, as known to persons skilled in the optical arts. Probe source 44 may be a laser or another source of light of the desired wavelength characteristics and intensity. In fact, probe beam 38 may be identical with heating beam 24, according to which embodiment the same beam provides both heating and diagnostic excitation. Alternatively, probe beam 38 may be independently directed toward surface 12.

Detectors 18 may be tailored to detect particular spectral features arising from surface 12 as a result of illumination by either heating beam 24 or probe beam 38, or both, by interposing a wavelength selective element 42 between surface 12 and detectors 18. Wavelength selective element 42 may be a dispersive element or an optical filter, as required by the application.

By monitoring and regulating the thermal profile of surface 12 of wafer 14 in accordance with the present invention, typical device yields may be increased. The described embodiments of the invention are intended to be merely exemplary and numerous variations and modifications will be apparent to those skilled in the art. All such variations and modifications are intended to be within the scope of the present invention as defined in the appended claims.

We claim:

1. An apparatus for maintaining detailed control of the temperature profile of a boundary between a medium and an ambient environment, the apparatus comprising:

a. a radiation detector for sensing radiation emitted by the medium, the radiation detector having an electrical output;

b. a source for emitting a beam of heating radiation having an intensity and a wavelength distribution directed to a specified location on the boundary between the medium and the ambient environment;

c. a pointing arrangement for orienting the beam of heating radiation toward a specified position on the boundary between the medium and the ambient environment; and d. a controller for directing the pointing arrangement to orient the beam toward a specified position and for modulating the intensity of the beam of heating radiation based at least on the electrical output of the radiation detector.

2. An apparatus according to claim 1, wherein the controller further governs to wavelength distribution of the heating radiation emitted by the source for penetrating the boundary between the medium and the ambient environment to a specified depth profile.

3. An apparatus according to claim 1, wherein the radiation detector is an infrared detector.

4. An apparatus according to claim 1, wherein the radiation detector is an array of detector elements.

5. An apparatus according to claim 1, wherein the source of heating radiation is an optical source.

6. An apparatus according to claim 1, wherein the source of heating radiation is a laser.

7. An apparatus according to claim 1, wherein the radiation sensed by the radiation detector is produced at the boundary between the medium and the ambient environment in response to irradiation by the heating radiation.

8. An apparatus according to claim 1, further comprising a source of probe radiation for irradiating the boundary between the medium and the ambient environment in such a manner as to produce radiation at the boundary between the medium and the ambient environment for sensing by the radiation detector.

9. An apparatus according to claim 1, further comprising a wavelength filter disposed between the boundary between the medium and the ambient environment and the radiation detector.

10. A method of maintaining a desired thermal profile across a surface of a medium, the method comprising:
  a. sensing radiation emitted by the medium;
  b. creating an electrical output corresponding to the sensed radiation;
  c. directing a beam of heating radiation to the surface of the medium;
  d. orienting the beam of heating radiation toward a specified position on the surface of the medium; and
  e. heating the specified position on the surface of the medium in response to at least the electrical output corresponding to the sensed radiation so as to maintain a desired thermal profile across the surface of the medium.

* * * * *